Patented Sept. 13, 1938

2,129,700

UNITED STATES PATENT OFFICE 2,129,700

SOLVENT FOR USE IN TREATMENT OF ORES

Merrill W. MacAfee, Los Angeles, Calif.

No Drawing. Refiled for application Serial No. 731,001, June 16, 1934. This application November 26, 1937, Serial No. 176,655

7 Claims. (Cl. 75—105)

This invention relates to chemical compounds and more particularly to a chemical compound used in the treatment of ores, as a solvent of gold, silver and other metallic constituents thereof.

It is an object of the invention to provide by a simple process of production, a new chemical compound characterized by a solvent action upon metals contained in metalliferous ores, more rapid and powerful than that of ordinary alkali cyanide.

The process employed in producing the new chemical compound, consists briefly in passing chlorine gas into a solution of a metallic cyanide, preferably an alkali metal cyanide under certain hereinafter prescribed conditions.

Temperature, pressure and concentration may be varied considerably. The form of absorption apparatus used is unimportant except insofar as efficiency is concerned.

The result of this process is a new compound comprising a combination of the element chlorine and a cyanide radical such as is represented in sodium cyanide, and providing a powerful solvent for metals as stated hereinbefore.

As an example, upon passing chlorine gas into an aqueous solution of sodium cyanide, a color change is produced, the solution becoming yellow and changing to orange and red successively and then changing to orange and red successively until it is almost black, the amount of depth of color being directly proportional to the chemical reaction that takes place in the process.

Ordinarily the process is stopped when the solution assumes an orange-red color or just before it darkens with the precipitation of a black flocculent decomposition product. Formation of the black precipitate has no deleterious effect except that it uses some of the cyanide in its formation. Thus, it will be found that, if the black precipitate is present in any visible quantity to an appreciable extent, the reaction has gone too far and CNCl gas is being formed. It will also be found that the NaCN is used up under these conditions. The following table illustrates this:

| Test No. | Concentration of NaCN in starting solution—percent | Time of clorination in minutes | Titration of chlorinated solution in terms of NaCN equivalent—percent | Per cent NaCN equivalents in chlorinated solution |
|---|---|---|---|---|
| 1 | 20.00 | 35 | 19.52 | 97.6 |
| 2 | 10.00 | 25 | 9.52 | 95.2 |
| 3 | 5.00 over 5% | 15 | 4.76 | 95.2 |
| 4 | 2.50 | 10 | 1.43 | 57.2 |
| 5 | 1.25 | 5 | .24 | 1.9 |
| 6 | .67 | 20 | .027 | .4 |

Color of solution etc.:
1. Orange.
2. Orange.
3. Orange-red—slight black precipitate.
4. Black—evolution of CNCl gas.
5. Yellow with black precipitate—copious evolution of CNCl gas.
6. Clear yellow—evolution of CNCl gas.

The liquid above the precipitate which, as stated hereinabove, may be of a color ranging from orange to black in accordance with the selective degree of reaction, contains the new compound which is the essence of the present invention.

That it is a definite compound is evinced by the fact that on evaporating the solution to dryness, the solids left are found to have increased in weight, changed color, changed melting point and crystal form from the solid cyanide started with.

In a specific case wherein sodium cyanide was used the color of the solid changed from white to dark orange and the melting point dropped from a red heat to approximately 95° C. The crystal form changed from the orthorhombic normal pyramidal or low rectangular pyramids of sodium cyanide to five-sided flat tablets that appear to be the orthorhombic hemimorphic type. As noted, sodium cyanide was used as the cyanide and on the basis of molecular weight the compound formed contains one atom of chlorine.

I have now determined that the product formed when the solution is orange in color and when little if any black precipitate is formed is XCNClCN where X is a metal, preferably an alkali metal as sodium. Reduced to its simplest form the probable reaction, in the case of sodium is as follows:—

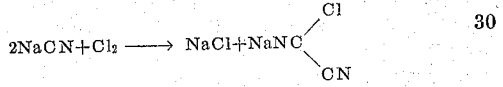

It is not the well known gaseous chloride of cyanogen or its polymer the solid chloride of cyanogen. This is apparent by the following enumerated differences in physical characteristics and chemical actions:

1. The chlorides of cyanogen are colorless and this compound is colored.
2. Their melting points are −5° C. and 140° C. for the gaseous and solid respectively, while the melting point of this compound is around 95° C.
3. Their solutions evaporated to dryness decompose into $NH_4Cl$ and $CO_2$, while this compound gives stable crystals of the compound on evaporation and a little ammonia.
4. Alkalis decompose the chlorides of cyanogen into hydrochloric acid and cyanic acid in the case of the gaseous, and hydrochloric acid and cyanuric acid in the case of the solid polymer. No decomposition of this compound occurs with alkalis unless heated when ammonia is evolved slowly, or the solution let stand in contact with the air for a long period of time.
5. Mercury does not precipitate $HgCl_2$ from solutions of this compound and does from the chlorides of cyanogen.
6. The chlorides of cyanogen are not in themselves solvents for gold and silver whereas this compound is a more rapid solvent for these metals than cyanide.

7. An excess of silver nitrate precipitates silver cyanide and silver chloride from this compound and does not from the chlorides of cyanogen.

The new compound is a metallic monochlor-dicyanate and far exceeds ordinary cyanide in its solvent effect upon metals and more particularly upon gold.

The sodium compound is referred to in the following data as Reagent SC–9, a purely laboratory designation having no bearing on its composition:

| Sample | White caps roaster calcine | | Brunswick aft. flotation tailing | | Idaho Maryland tailing pile composite | |
|---|---|---|---|---|---|---|
| Solution | | | | | | |
| Ratio | 1:15 | 1:15 | 1:4 | 1:4 | 1:4 | 1:4 |
| Hours | | | | | | |
| Agitation | 24 | 24 | 15 | 15 | 24 | 24 |
| KCN start | 1.0# | | 1.2# | | 0.6# | |
| KCN finish | .6# | | .6# | | .4# | |
| KCN consumed | 6.0# | | 2.4# | | .8# | |
| SC–9 start | | 1.0# | | 1.2# | | 0.6# |
| SC–9 finish | | .6# | | .7# | | .4# |
| SC–9 consumed | | 6.0# | | 2.0# | | 0.8# |
| CaO start | High | High | 2.0# | 2.0# | 2.0# | 2.0# |
| CaO finish | High | High | .5# | .5# | 0.7# | 0.5# |
| CaO consumed | | | 6.0# | 6.0# | 5.2# | 6.0# |
| Heading assay | $22.40 | $22.40 | $0.31 | $0.31 | $2.33 | $2.33 |
| Tailing assay | $4.80 | $2.60 | $0.08 | $0.01 | $0.52 | $0.37 |
| Percent extraction | 78.6 | 88.4 | 74 | 97 | 78 | 84 |

| Sample | Brunswick filter concentrate | | Brunswick filter concentrate | | Brunswick compos. filter concentrate | |
|---|---|---|---|---|---|---|
| Solution | | | | | | |
| Ratio | 1:4 | 1:4 | 1:3 | 1:3 | 1:4 | 1:4 |
| Hours | | | | | | |
| Agitation | 58 | 58 | 24 | 24 | 24 | 24 |
| KCN start | 2.2# | | 6.0# | | 5.0# | |
| KCN finish | Main-tained | | 3.1# | | 2.9# | |
| KCN consumed | | | 8.7# | | 8.4# | |
| SC–9 start | | 2.2# | | 6.0# | | 4.8# |
| SC–9 finish | | Main-tained | | 3.2# | | 2.6# |
| SC–9 consumed | | | | 8.4# | | 8.8# |
| CaO start | 2.4# | 2.4# | 2.0# | 2.0# | 4.0# | 4.0# |
| CaO finish | Main-tained | Main-tained | .8# | 1.7# | 1.7# | 1.5# |
| CaO consumed | | | 3.6# | .9# | 9.2# | 10.0# |
| Heading assay | $316.00 | $316.00 | $236.00 | $236.00 | $344.00 | $344.00 |
| Tailing assay | $11.38 | $9.30 | $17.00 | $8.00 | $10.35 | $7.79 |
| Percent extraction | 96 | 97 | 93 | 97 | 97 | 98 |

The above figures are in pounds per ton of solution except consumption of reagent which it in pounds per ton of ore. Assays are in dollars gold per ton of ore, gold @ 20.67 per ounce.

This application is a refiling of my application Serial No. 731,001 filed June 16, 1934, renewed April 19, 1937.

I claim:

1. As a new product, the reaction product resulting from passing chlorine gas into an aqueous solution of an alkali metal cyanide compound until said solution is substantially orange red in color, said product being characterized by the following properties: Melting point about 95° C.; $HgCl_2$ is not precipitated from solution upon the addition of mercury; forms stable crystals when heated to dryness; and non-decomposable by alkali in the cold.

2. As a new product, the reaction product resulting from passing chlorine gas into an aqueous solution of a sodium cyanide compound until said solution is substantially orange red in color, said product being characterized by the following properties: Melting point about 95° C.; $HgCl_2$ is not precipitated from solution upon the addition of mercury; forms stable crystals when heated to dryness; and non-decomposable by alkali in the cold.

3. A chemical reagent for dissolving precious metals from their ores comprising the reaction product resulting from passing chlorine gas into an aqueous solution of sodium cyanide until said solution is substantially orange red in color, said product being characterized by the following properties: Melting point about 95° C.; $HgCl_2$ is not precipitated from solution upon the addition of mercury; forms stable crystals when heated to dryness; and non-decomposable by alkali in the cold.

4. A compound having the formula XCNClCN wherein X is an alkali metal.

5. A compound having the formula NaCNClCN.

6. A process for recovering precious metal value from a material containing the same comprising leaching said material with a solution containing a compound of the formula XCNClCN wherein X is an alkali metal.

7. A process for recovering precious metal value from a material containing the same comprising leaching said material with a solution containing a compound of the formula NaCNClCN.

MERRILL W. MacAFEE.